United States Patent
Zhang et al.

(10) Patent No.: US 11,940,900 B1
(45) Date of Patent: Mar. 26, 2024

(54) DETERMINING AND PROVIDING REPRESENTATIONS OF PROGRAM FLOW CONTROL

(71) Applicant: INTERNATIONAL BUSINESS MACHINES CORPORATION, Armonk, NY (US)

(72) Inventors: Bao Zhang, Beijing (CN); Jin Hong Fu, Beijing (CN); Peng Hui Jiang, Beijing (CN); Shi Chong Ma, Beijing (CN); He Huang, Beijing (CN); Jia Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 17/936,233

(22) Filed: Sep. 28, 2022

(51) Int. Cl.
G06F 9/44 (2018.01)
G06F 9/455 (2018.01)
G06F 9/46 (2006.01)
G06F 11/32 (2006.01)
G06F 11/36 (2006.01)

(52) U.S. Cl.
CPC ................ *G06F 11/3636* (2013.01)

(58) Field of Classification Search
CPC .. G06F 11/143; G06F 21/566; G06F 11/1492; G06F 21/52; G06F 11/3636; G06F 11/3471; G06F 11/3055; G06F 11/3612; G06F 11/302; G06F 11/3017
See application file for complete search history.

(56) References Cited

U.S. PATENT DOCUMENTS

| 8,595,702 B2 * | 11/2013 | Maybee ............ G06F 11/3636 717/133 |
| 2008/0196012 A1 | 8/2008 | Cohen et al. |
| 2015/0220314 A1 | 8/2015 | Divekar et al. |

(Continued)

FOREIGN PATENT DOCUMENTS

CN 112989363 A 6/2021

OTHER PUBLICATIONS

Lessa et al., JIVE: A Pedagogic Tool for Visualizing the Execution of Java Programs, 6 pages (Year: 2011).*

(Continued)

*Primary Examiner* — Thuy Dao
(74) *Attorney, Agent, or Firm* — Jared Chaney; Matthew M. Hulihan; Heslin Rothenberg Farley & Mesiti PC

(57) ABSTRACT

Determination and provision of improved representations of program flow control are provided by a method that monitors execution of binary code of a program on a computer system. The monitoring includes monitoring manipulation(s) of call stack(s) maintained by the computer system for the execution of the binary code. The method, based on the monitoring, determines function call pattern(s) and branch pattern(s) exhibited by the execution of the binary code. The method identifies, from the binary code and using the determined function call pattern(s) and branch pattern(s), function calls and branches, relations between the function calls and branches, and function and variable names. The method also provides a representation of program flow control of the program using the identified function calls and branches, relations, and function and variable names.

20 Claims, 11 Drawing Sheets

(56) References Cited

U.S. PATENT DOCUMENTS

2016/0170725 A1    6/2016    Holton et al.
2020/0125732 A1    4/2020    Iyer et al.

OTHER PUBLICATIONS

"IBM Application Discovery 5.0.3" (no longer published—last updated: Mar. 8, 2021). Retrieved on Aug. 30, 2022 from the Internet URL: <https://www.ibm.com/docs/en/addi/5.0.3?topic=graphs-crossapplications-call-graph>, 2 pgs.

"Rigi Software". Retrieved on Aug. 30, 2022 from the Internet URL: <https://en.wikipedia.org/wiki/Rigi_(software)>, 3 pgs.

\* cited by examiner

DETERMINING AND PROVIDING REPRESENTATIONS OF PROGRAM FLOW CONTROL

BACKGROUND

Effective software maintenance and augmentation relies on proper program comprehension, error diagnostics, development of patches, and test coverage assessment to assess efficacy of software developments (patches, extensions, etc.), among other elements. Achieving these can be difficult. Many software products, particularly those with lengthy, historical development/commit lines, often involve program flow having potentially thousands of paths. This necessitates significant effort to diagnose errors and develop fixes, for instance. Meanwhile, modern programming architectures provide flexibility for interacting with a program, for instance via plugins implemented based on dependency injection or inversion of control, as examples, but necessitate a solid understanding of code logic and user scenarios. Further, with respect to test coverage assessment such as to assess a potential code fix, it is difficult or impossible to estimate change risk without a comprehensive understanding of the program and is execution flow.

It is common that software program source code is unavailable, in whole or part, to a service provider working on maintenance or augmentation of the software. In an example scenario, a customer application executes over middleware, which executes over run time environment(s), such as java or C, provided over an executing operating system. The customer itself might not have the source code of its own application (especially in situations where the application is a legacy application). Even if the customer has the source code, the customer likely does not have the source code of the middleware or operating system and therefore it might be difficult for the customer to debug the application in such a situation. Meanwhile, from the perspective of a service provider that provides an operating system, run time environment(s), and middleware over which the customer application runs, the service provider may have no access/ privilege to the source code, instead having only the binary code of the customer application and system dumps that might be generated.

To understand program logic and flow, a call graph (also known as a call multigraph) can be helpful. The call graph indicates calling relationships between subroutines in a program via a software visualization tool (usually Unified Markup Language based), providing a graphical presentation of program flow. Current practices base the generation of call graphs on static analysis of program source code rather than binary code, for example, which only contains the binary instructions. Failure of a call graph tool to work with binary instruction code presents a problem in current call graph generation approaches as they do not deal with function pointers, longjumps, and other condition handling methodologies, as examples. The call graphs generated by modeling tools do not contain control information, such as conditional control information like the conditions under which a given function call is used between two components. These and other aspects can be useful and important, however, for application debugging and other tasks such as program comprehension, error diagnostics, development of patches, and test coverage assessment noted above.

SUMMARY

Shortcomings of the prior art are overcome and additional advantages are provided through the provision of a computer-implemented method. The method monitors execution of binary code of one or more programs on a computer system. The monitoring includes monitoring manipulation of at least one call stack maintained by the computer system for the execution of the binary code of the one or more programs. The method additionally, based on the monitoring, determines at least one function call pattern and at least one branch pattern exhibited by the execution of the binary code of the one or more programs. Further, the method obtains binary code of a target program and identifies, from the binary code of the target program, and using the determined at least one function call pattern and at least one branch pattern, function calls and branches, relations between the function calls and branches, and function and variable names. In addition, the method provides a representation of program flow control of the target program using the identified function calls and branches, relations, and function and variable names. These aspects have advantages at least in that they facilitate improved diagnosis, analysis, debugging and/or target program comprehension via an improved and augmented representation of program flow control in comparison to conventional offerings. Additionally, this is provided from the binary code of the target program, e.g. without the need for access to the target program source code, and regardless whether the target program source code is available/accessible.

Further, a computer system is provided that includes a memory and a processor in communication with the memory, wherein the computer system is configured to perform a method. The method monitors execution of binary code of one or more programs on a computer system. The monitoring includes monitoring manipulation of at least one call stack maintained by the computer system for the execution of the binary code of the one or more programs. The method additionally, based on the monitoring, determines at least one function call pattern and at least one branch pattern exhibited by the execution of the binary code of the one or more programs. Further, the method obtains binary code of a target program and identifies, from the binary code of the target program, and using the determined at least one function call pattern and at least one branch pattern, function calls and branches, relations between the function calls and branches, and function and variable names. In addition, the method provides a representation of program flow control of the target program using the identified function calls and branches, relations, and function and variable names.

Yet further, a computer program product including a computer readable storage medium readable by a processing circuit and storing instructions for execution by the processing circuit is provided for performing a method. The method monitors execution of binary code of one or more programs on a computer system. The monitoring includes monitoring manipulation of at least one call stack maintained by the computer system for the execution of the binary code of the one or more programs. The method additionally, based on the monitoring, determines at least one function call pattern and at least one branch pattern exhibited by the execution of the binary code of the one or more programs. Further, the method obtains binary code of a target program and identifies, from the binary code of the target program, and using the determined at least one function call pattern and at least one branch pattern, function calls and branches, relations between the function calls and branches, and function and variable names. In addition, the method provides a representation of program flow control of the target program using the identified function calls and branches, relations, and function and variable names.

Additional features—optional, permissive, preferred, and/or advantageous—are realized through concepts described herein, at least some of which are provided as follows:

The monitoring can further include maintaining a buffer of most-recently executed instructions, and the determination of the at least one function call pattern and at least one branch pattern can include providing, to a pattern recognition component, contents of the buffer upon manipulation of the program stack. The pattern recognition component can determine the at least one function call pattern and at least one branch pattern by pattern recognition based at least in part on the provided buffer contents. This has an advantage as the provided buffer content informs of a context in which a given function call or branch is performed, which is in turn useful identifying other portions of other code having similar function call or branch behavior. Additionally or alternatively, the pattern recognition component can include an artificial intelligence model trained based on featurizing sets of instructions. The artificial intelligence model can be configured to accept as input an n-dimensional input vector of instructions and predict a function call pattern or branch pattern based on the input n-dimensional input vector. Use of an artificial intelligence model in this manner has an advantage in that pattern determination can be taught and improved/refined automatically based on training in order to accurately classify program flow controls in target programs, including controls not explicitly previously observed and identified as such.

Additionally or alternatively, monitoring the execution of the binary code of the one or more programs can include monitoring processor condition codes indicating conditions under which conditional branches are taken. The at least one branch pattern can include at least one conditional branch pattern reflecting a pattern under which a conditional branch is taken. Monitoring and providing condition codes in conjunction with stack manipulations indicating functions calls and branches has an advantage in that conditions for observed branches can be identified and attached to observed branches for provision in representations of program flow control, providing better understanding of program flow of target application(s).

Additionally or alternatively, the identifying the function calls and branches, and relations therebetween, can identify a relation between a function call and a conditional branch in the binary code of the target program, the relation indicating condition(s) under which the function call is made, which has an advantage in that provision of such relation in the representation of the program flow control has utility in various software maintenance undertakings.

Additionally or alternatively, determining the function call pattern(s) and branch pattern(s) can include providing the processor condition codes to the pattern recognition component. The pattern recognition component can determine the function call pattern(s) and branch pattern(s) by pattern recognition based at least in part on the provided processor condition codes. This has an advantage in that a provided buffer content informs of a context in which a given function call or branch are performed, which is useful for pattern determination to identify other portions of code with similar function call or branch behavior.

Additionally or alternatively, identifying the function and variable names can include identifying, via an application programming interface, a function or variable name using a symbol table of the target binary code that maps function and variable names to memory addresses, providing an advantage of identifying variables and functions, in a representation of program flow control, in a user-readable and useable manner, rather than as an address.

Additionally or alternatively, providing the representation of program flow control can include building and presenting in a graphical interface a call graph identifying functions of the target binary code, calls as between the functions to indicate program flow, and conditions for branching from one function to another function of the target binary code. Such presentation has an advantage in that it enables a user to readily identify via graphical depiction program flow control elements beyond mere function names and indications of which functions call each other, which has advantages of utility and program comprehension.

Additionally or alternatively, providing the representation of program flow control can include obtaining an initial call graph, such as one that might be produced by conventional practices, indicating the functions of the target binary code, and augmenting the initial call graph to graphically convey the calls as between the functions and the conditions for branching. The augmenting can produce an augmented call graph, where the presenting of the representation of program flow control presents the augmented call graph. Augmenting an initial call graph has an advantage in that a new call graph need not be generated from scratch, as instead a conventional call graph can be augmented with additional information as obtained by way of aspects described herein, which provides speed and efficiency by avoiding extraneous work.

The target program can be a different program than the one or more programs, or could be one the one or more programs that are the subject of the monitoring.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for determining and providing improved representations of program flow control, for instance call graphs, as an example. In example embodiments, call graphs are generated with program flow control information, such as conditional branch information. The generation is based on learning from runtime analysis of executing binary code of one or more programs and identification therefrom of functional call patterns and branch patterns, and optionally through the use of artificial intelligence-based pattern identification. Identified patterns can be used to analyze binary code of target program(s) (which might be different from the programs(s) on which the learning is based) and identify useful information such as function calls and branches, relations between the function calls and branches, and function and variable names. A representation of program flow control of the target program can be provided that uses and/or incorporates the identified function calls and branches, relations, and function and variable names, as described herein.

Figure 1:
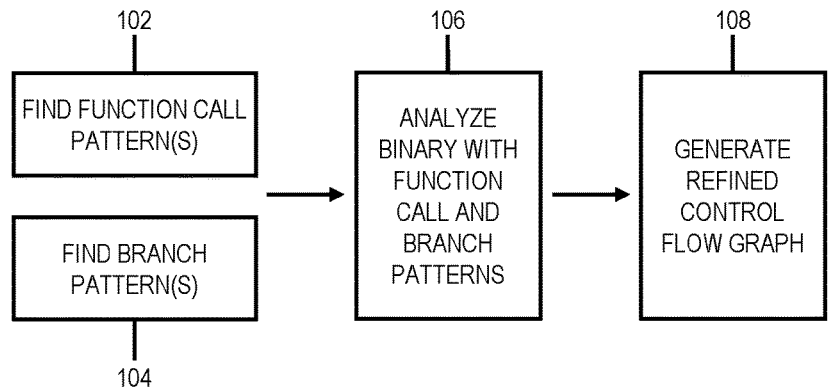
FIG. 1 depicts an example conceptual flow for generating a program flow control representation in accordance with aspects described herein.

FIG. 1 depicts an example conceptual flow for generating a program flow control representation in accordance with aspects described herein. The presents at a high level an example process to be performed by one or more computer systems as described herein. In aspects of FIG. 1, the process finds (102) function call pattern(s) and finds (104) branch pattern(s), e.g. pattern(s) of conditional and/or nonconditional branches in the execution of binary code of one or more programs on a computer system. The one or more programs could be regarded as training programs to train on function call patterns and branch patterns exhibited by execution of the binary code of the one or more programs. Thus, the determination of the patterns can be made based on real-time analysis of the executing binary code of the one or more programs. In examples, the binary code is available to an entity for purposes of program flow understanding but the source code of the program is not. The process then, for a target program for which the binary code is available but, e.g. source code is not, analyzes/digs (106) the binary code of the target program with the function call pattern(s) and branch pattern(s) to identify, from the binary code of the target program, and using these patterns, function calls and branches in the binary code of the target program, relations between the function calls and branches, for instance conditions under which branches to give functions are made by way of the function calls, and names of functions and variable of the program. With this identified information, including which sequences of instructions of the binary code of the target application correspond to function calls and which sequences of instructions of the binary code of the target program correspond to branches, for instance conditional branches, the process generates (108) an improved program flow control representation using the information, for instance by including some or all of the information in a graphical representation of program flow control, for instance a call graph.

Provided in various embodiments, and as described in greater detail herein, are the following aspects, among others:

approaches to provide, based on binary code, improved representations of program flow control (such as call graphs) with control conditions;

approaches to determine function call patterns of run-time execution of binary code of program(s) based on observing call stack manipulation occurring during run-time;

approaches to determine branch patterns, including conditional and/or nonconditional branch patterns, of run-time execution of binary code of program(s) based on observing processor condition code(s) and jump (or other) statements;

approaches to discover function calling and conditional branching in target binary code based on pattern matching and a finding component (such as a binder application programming interface) to find function and variable names corresponding to memory addresses;

approaches for generating/providing representations of program flow control (such as call graphs) from binary code of a target program;

approaches to improve/augment representations of program flow control (such as call graphs) to include conditional branch information; and approaches to improve/augment representations of program flow control (such as call graphs) of run-time execution of binary code of high-level languages of various platforms.

Figure 2:
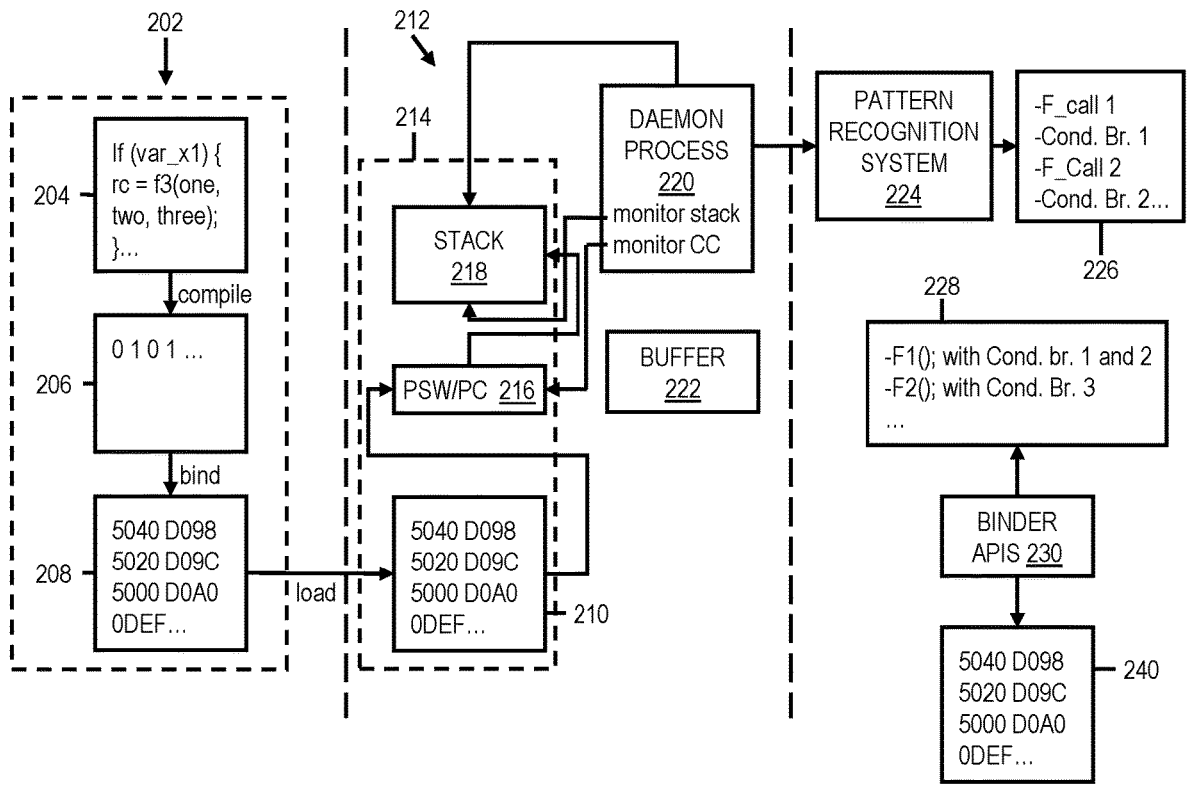
FIG. 2 depicts a conceptual diagram for determining and providing improved representations of program flow control, in accordance with aspects described herein.

FIG. 2 depicts a conceptual diagram for determining and providing improved representations of program flow control, in accordance with aspects described herein. Aspects generally involve analyzing execution of one or more programs to learn function call and branch patterns for program flow. This learning may train an artificial intelligence component to recognize function calls and branching within program code generally, for instance. Then, binary code of target program(s), for instance programs other than those that served as the basis for the learning, can be analyzed to identify specific function calls and branches of those target program and based on the learned patterns in order to provide an improved understanding of program flow of the target program(s). Aspects of the learning are presented in FIG. 2 with reference to monitoring of execution of binary code (210) of just one program (for simplicity), though it should be understood that the learning might be based on monitoring execution of binary code of a plurality of programs, as this is expected to result in better training overall for function call and branch patterns, and therefore identification of function calls and branches in target programs.

Referring to FIG. 2, at an application side 202 exists source code in the form of file(s) 204 containing source code of an application/program, an object file 206 produced based on compilation of the source file(s) 204, and a load module 208 based on binding (linking) object file 206. Load module 208 can be loaded as binary code 210 into memory of an operating system (OS) 212 at an OS side.

Often a service provider has no access to the source file(s) 204, object file 206 and load module 208, and this may be for any of various reasons. Instead, in terms of program code of the program, the service provider has only the binary code 210 to execute. In accordance with aspects described herein, operating system 212 can monitor stack manipulation and condition code (e.g. program status word condition code) to find function call and condition branch patterns from execution of program 210. As noted, this can be done for many programs. A goal of the service provider might be to derive, if possible, enough information from analyzing the binary code of such one or more programs (e.g. 210 and other binary code) to enable the service provider to effectively produce, even if just conceptually, an improved understanding of program flow control of binary code of target programs, for instance of other program(s) (represented as load module 240) different from the programs monitored.

As part of the analyzing, at the OS 212 side, the binary code 210 can be executed on an operating system of a computer system for run-time observation, i.e. observation of the running program. The address space 214 for the running program includes at least the binary code 210, central processing unit (CPU) program status word (PSW)/program counter (PC) 216, which indicates flow of program execution, and a call stack 218, also referred to as the program stack, execution stack, or run-time stack, and others. Here the call stack 218 is representative of one or more stacks maintained by the operating system of the computer system for the execution of the binary code 210, and may encompasses various types of stacks including, but not limited to, those associated with function calls.

In accordance with aspect described herein, execution of the binary code 210 is monitored. In this example, this is performed by/using daemon process 220 that maintains a buffer 222 of latest (most-recently executed) instructions, which may include a currently-executing instruction. Specifically, the daemon process 220 monitors execution of the binary code 210, which includes monitoring manipulation of the stack 218 and monitoring condition code(s) of the computer system processor(s) executing the binary code 210. The processor condition code(s) may be presented in a register, such as the PSW register, and indicate, among other information, conditions under which conditional branches are taken by the executing binary code. Stack manipulation occurs when function calls are made. For instance, a new stack frame can be allocated/pushed when a function is called, and a stack frame can be popped/freed when a function returns. The return addresses are pushed onto and popped from the stack corresponding to function calls as part of pushing/popping 'stack frames' with state information that includes the return address back to the function's (routine's) caller.

Based on the monitoring performed by the daemon process 220, function call pattern(s) and branch pattern(s) exhibited by the execution of the binary code 210 are determined. The function call pattern determination is performed by a pattern recognition system 224 in this example. In connection with the pattern determination, contents of the buffer 222 can be provided upon, or based on, manipulation of the stack 218. For instance, the daemon process 220 (or another process) can send a latest n number of instructions, which may be some or all of the instructions in the buffer 222, to the pattern recognition system 224 when the daemon process 220 observes any manipulation (or any manipulation of a defined/identified character) of stack 218. Alternatively, the daemon process 220 or other process could notify the pattern recognition system 224 of a manipulation and such notification can trigger/cause the pattern recognition system 224 to read the buffer 222 and retrieve such instructions therefrom, assuming the system 224 has read access to the buffer 222. To enhance read/write performance, the storage for buffer 222 can be allocated in shared memory, i.e. memory that is shared between processes, for instance the daemon process 220 and a process implementing the pattern recognition system 224. In a particular embodiment, the instructions of the buffer 222 are stored as unidirectional cyclic linked list(s) in the buffer.

Since there are typically several kinds of function calls during program execution, the provision of buffer content to the pattern recognition system 224 encompasses several instances in which buffer content is provided during execution of the binary code 210, and the specific buffer content (instructions) provided at any given instance is expected to vary from that of other instances because different sets of instructions will have been most-recently executed just prior to those function calls as program flow progresses.

In embodiments, the daemon process 220 can be turned on/off based on an environment variable or runtime option. This provides selective enablement or disablement of the runtime monitoring depending on whether function call pattern/branch pattern learning based on the particular program 210 provided is desired at that particular time.

The pattern recognition system 224 also determines the branch patterns, which may be based at least in part on provided buffer contents and condition codes. In some examples, condition codes associated with specific instruction execution are also stored in the buffer 222. In any case, buffer content and condition codes may be provided to the pattern recognition system 224 by the daemon process 220, in examples. The pattern recognition system 224 could be any suitable component configured to recognize patterns of function calling and branching as exhibited by the execution and informed by the monitoring thereof. In some embodiments, the pattern recognition system 224 is/includes an artificial intelligence (AI) model. The AI model could be trained to recognize such patterns, for instance trained based on featurizing sets of instructions. The AI model can be configured to accept as input an n-dimensional input vector of instructions (such as those that might be provided on a stack manipulation) and predict a function call pattern or branch pattern based on the input n-dimensional input vector.

The pattern recognition system 224 determines patterns 226, for instance patterns for function calls (function call 1, function call 2, etc.) and patterns for conditional branches (conditional branch 1, conditional branch 2, etc.). With the patterns 226, specific sequences of binary code (e.g. 240) of target programs, which could be, associated with function calls and branches 228, for instance condition branches, can be identified.

In examples, if a specific code sequence in target binary code 240 matches to a given function call pattern (pattern for function call 3 for instance), it is identified that that sequence calls the corresponding function (function 3). If before the call to function 3 there is a branch, for instance a conditional branch identified by a conditional branch pattern, this will be identified too. With respect to conditional branch patterning, condition codes put into condition code registers when executing training program binary code can inform of conditional branches. A jump (or other branch) statement can be taken based on CPU conditions code(s). Determining a branch pattern can include provision of these condition codes to the pattern recognition system 224, which can identify a pattern under which a given conditional branch is taken. Thus, outputs from pattern recognition are identified function call patterns and branch patterns, and relations between function call(s) and branch(es), which are useful for identifying function calls and branched in binary code of target program(s). An example output 228 indicates function calls and the conditions to reach them in the target program (by way of the binary code 240), e.g. to reach function 1, conditions 1 and 2 must have been met (to take conditional branches 1 and 2), and to reach function 2, condition 3 much have been met (to take conditional branch 3).

Continuing with FIG. 2, a binder application programming interface (API) 230 is leveraged to identify function and variable names for function and branch addresses observed in the binary code instructions of the target program. Function and variable names are useful for generating/ refining a program function call representation, for instance a call graph for the target program, to incorporate such names. The names can be identified using a symbol table of the binary code 240 that maps function and variable names to memory addresses that are observed in the binary code 240. For instance, a function address can be identified from the binary code 240 instructions, and the binder API 230 can be used to find the function name corresponding to that address.

It is noted that the pattern learning process could be performed by the service provider or the customers, if desired.

Figure 3:
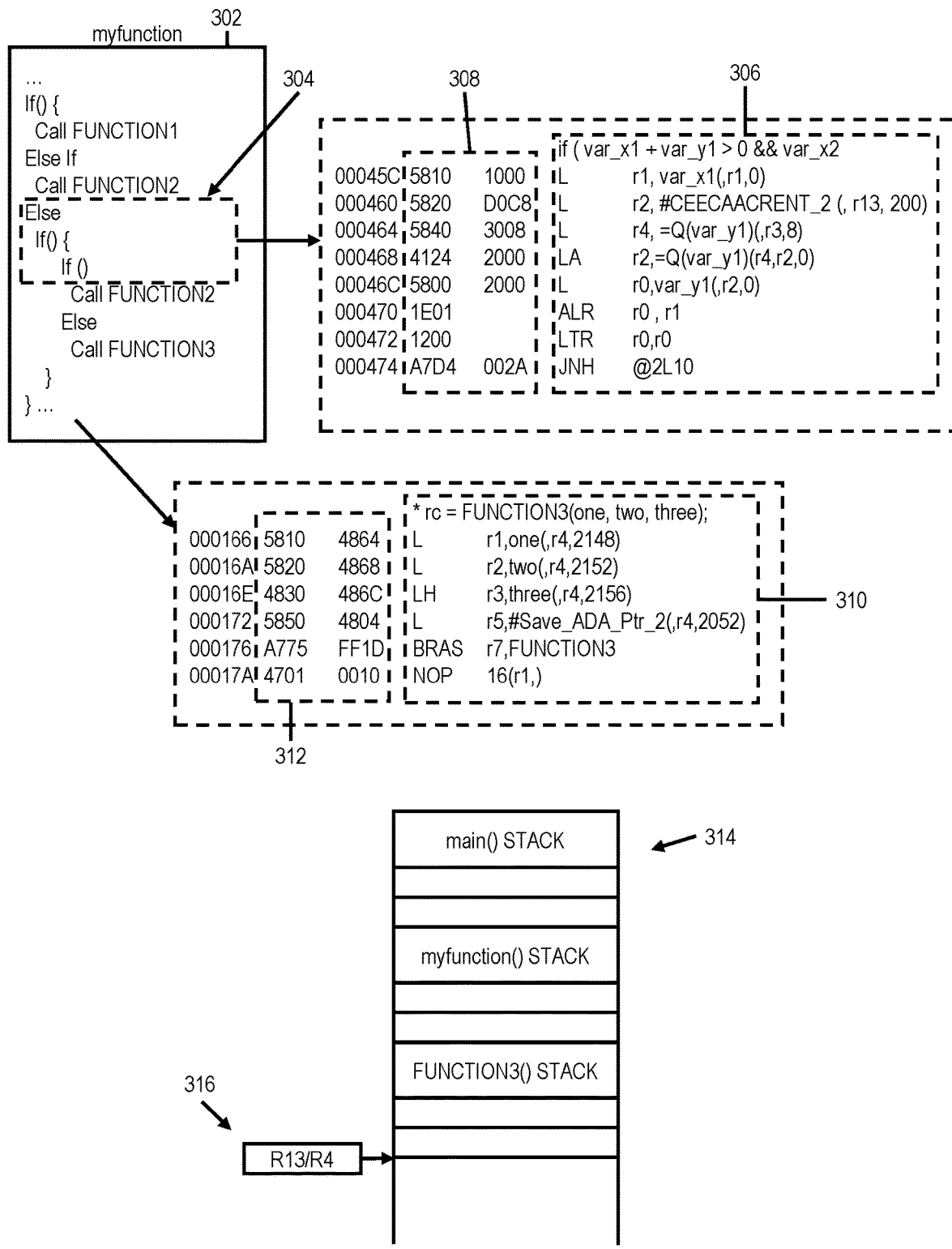
FIGS. 3-6 depict examples of function calling and branching for which patterns may be determined in accordance with aspects described herein.

FIGS. 3-6 depict examples of function calling and branching for which patterns may be determined in accordance with aspects described herein. Shown are various function call types that could be supported, which could correspond to varying languages and operating systems that might be involved. Referring initially to FIG. 3, source code 302 of a function named myFunction is shown. The function includes a portion 304. The assembly code and binary code corresponding to portion 304 are shown as assembly code 306 and binary code 308 (which may be part of a listing file). Also shown as assembly code 310 and binary code 312 (which may be part of a listing file) are assembly code and binary code of a subroutine, named FUNCTION3. A corresponding call stack 314 associated with binary code execution is also shown. This is an example function call stack of the 'extra performance linkage' (XPLINK) linking convention.

In this example, the start of the application/program begins with a main function (not shown) that calls myFunction( ) In the source code 302 depicted, myFunction( ) calls (i) FUNCTION1 under a first condition, (ii) FUNCTION2 under a second condition, or (ii) under a third condition, FUNCTION2 if a fourth condition is also met or FUNCTION3 if the fourth condition is not also met. The stack pointer 316 in this example is provided as register 13/register 4. The stack 314 in this example is a downward-growing stack.

Figure 4:
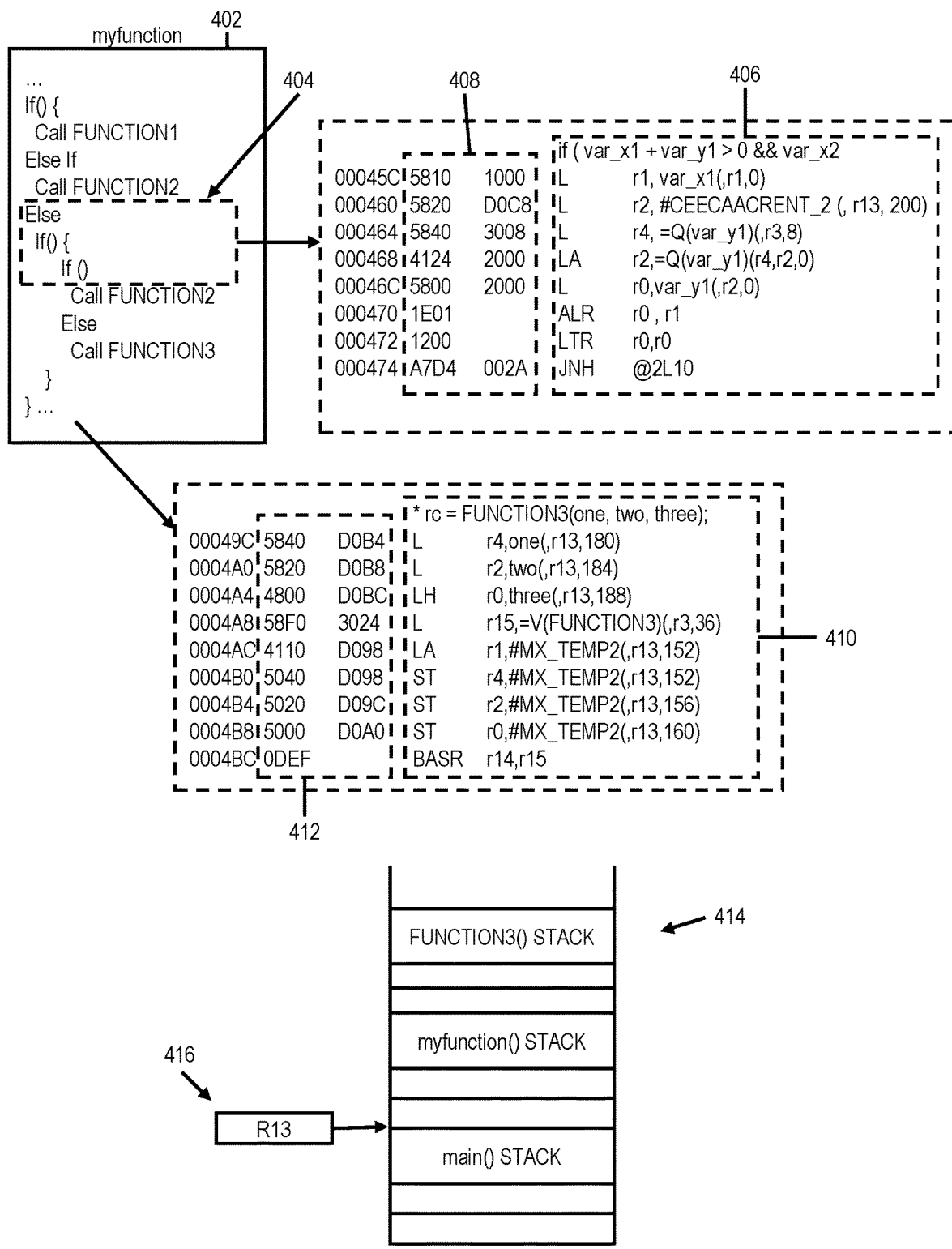

FIG. 4 is similar to FIG. 3 in that it depicts source code 402 of myFunction( ) with portion 404 of the source code shown in corresponding assembly code 406 and binary code 408. Also depicts is assembly code 410 and binary code 412 of the FUNCTION3 function, and corresponding call stack 414 and call stack pointer 416 (provided in register 13 in this example). The same conditional function calling as in the example of FIG. 3 is presented in FIG. 4, and stack 414 in this example is an upward-growing stack. FIG. 4 depicts an example of a base function call stack and so assembly/binary code differs from that of the example of FIG. 3.

Figure 5:
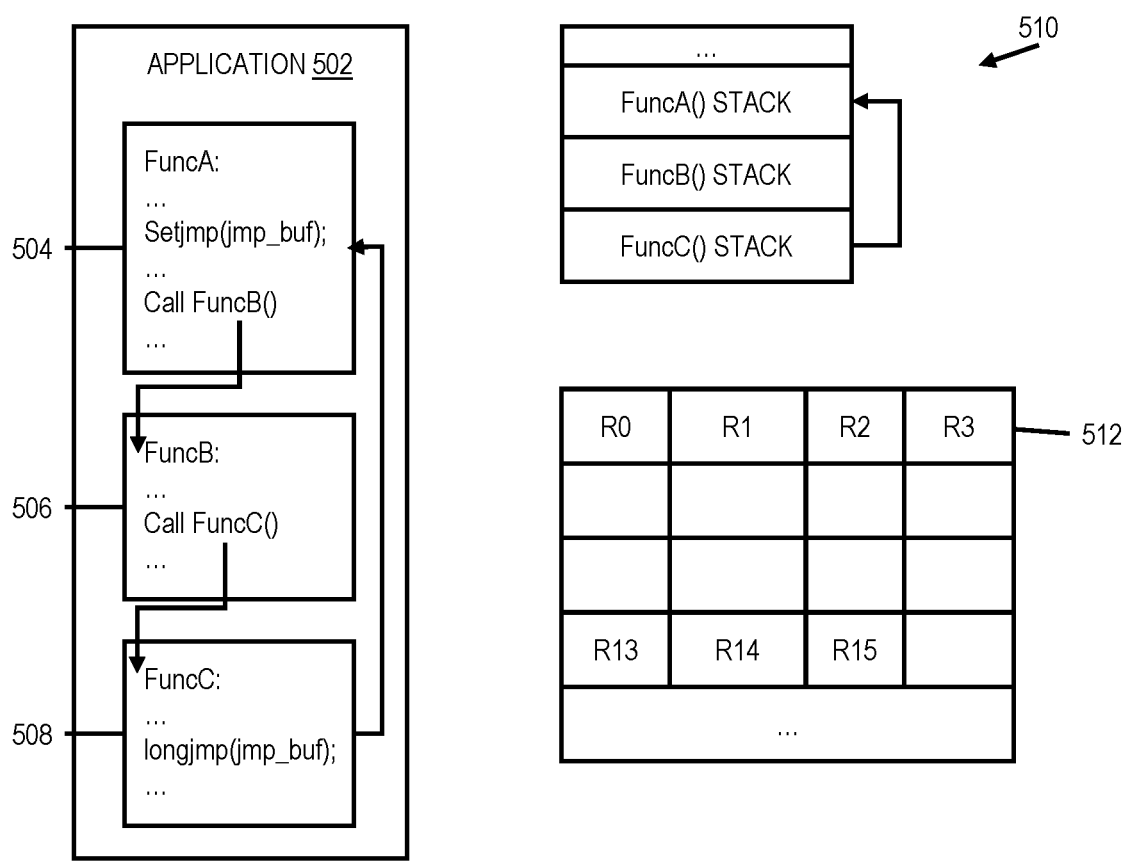

FIG. 5 depicts a 'longjump' scenario in which, within application 502, function A 504 ("FuncA") records a context in jmp buffer and eventually calls function B 506 ("FuncB"), which in turn calls function C 508 ("FuncC"). Function C issues the longjmp( ) command with the jmp_buf set by FuncA. This causes a return from FuncC back up to the set point in FuncA. The setjmp( ) command sets a position and returns a first return value (e.g. 0), while the longjmp( ) returns program flow to the position that was previously set and returns a different return value. Stack 510 includes elements for each of FuncA, FuncB, and FuncC. In a longjump scenario, there is a traverse of the stack from FuncC directly to FuncA (which is an example stack manipulation event that the daemon 220 would monitor and identify), and FuncB and FuncC will be collapsed/destroyed. Table 512 represents the jmp_buf buffer that records register values to save state/context.

Figure 6:
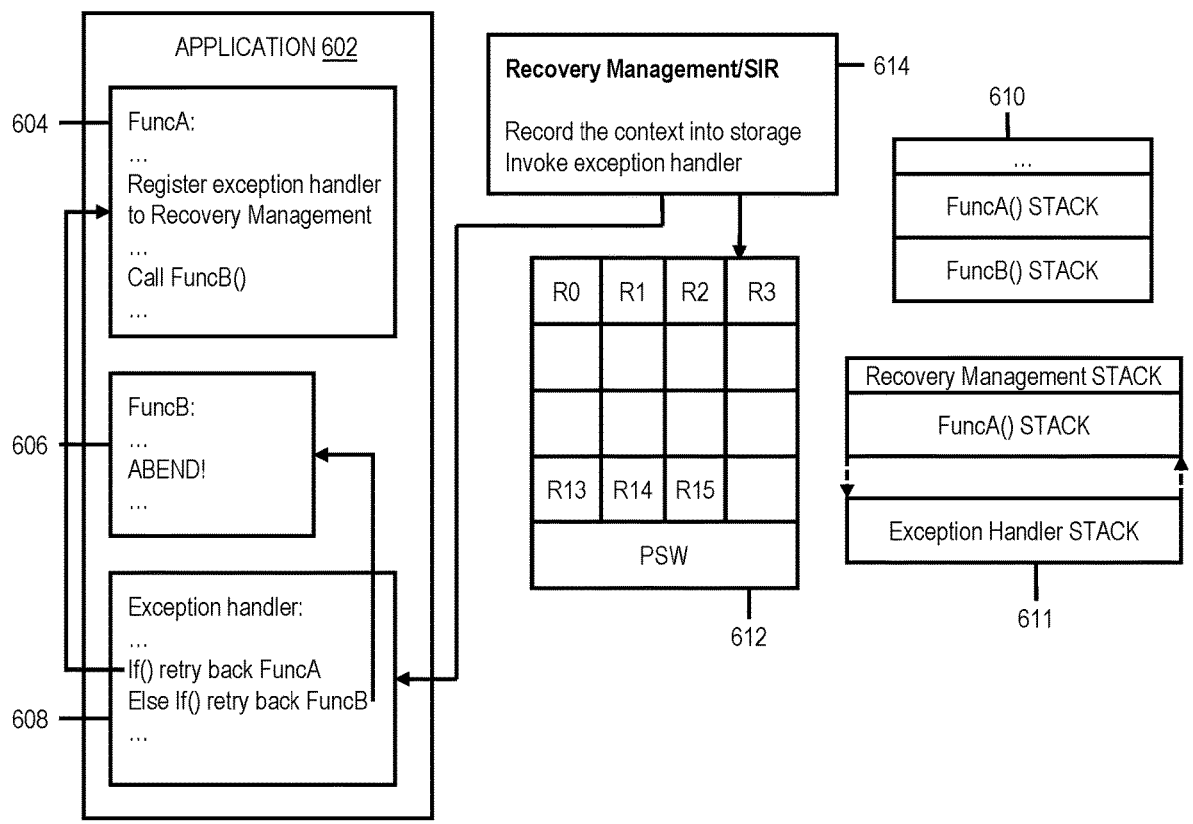

FIG. 6 depicts an example scenario for signal and exception handling in which, within application 602, function A 604 ("FuncA") registers an exception handler to recovery management/signal interface routine component 614, and eventually calls function B 606 ("FuncB"), which causes an exception (ABEND!). The exception causes program flow to proceed to recovery management 614, which records exception context in exception context table 612 and performs resume calling to exception handler 608 of the application 602. The exception handler is configured to retry FuncA under a given condition, otherwise return to FuncB under a given condition, or else terminate. Here, two stacks are maintained—an application stack 610 corresponding to functions FuncA and FuncB of application 602 and an operating stack 611 corresponding to recovery management 614 and exception handler function 608 of application 602. In this case, the daemon 220 could monitor both stacks 610 and 611 for events/actions performed with respect to those stacks.

Aspects described herein can recognize various function call patterns, including normal function calls, function pointer, signal and exception handling, longjmp( ) recovery management for base program function call, XPLINK function call, and function calls of varying bit lengths (e.g. 31-bit, 32-bit, 64-bit), as examples.

In connection with an example conditional branch pattern determination, the daemon process 220 can send the latest n instructions to the pattern recognition system/machine 224 when there is a jump statement based on the CPU condition code. The following examples depict binary code along with corresponding counterpart assembler code to assist in understanding aspects explained herein. The immediately following example provides example binary and assembly code incorporating a conditional jump:

|  |  | if (var_z < 10) { |
|---|---|---|
| * |  |  |
| 5840 3010 | L | r4,=Q(var_z)(,r3,16) |
| 4114 1000 | LA | r1,=Q(var_z)(r4,r1,0) |
| 5800 1000 | L | r0,var_z(,r1,0) |
| A70E 000A | CHI | r0,H'10' |
| A7B4 0066 | JNL | @2L9 |

In the above, the CHI is the compare instruction that results in a condition code being set. The following jump instruction (JNL) will execute based on that set condition code.

The following provides example binary and assembly code incorporating a load and test instruction for conditional branching:

|  |  | if(var_x3 + var_x4 == 0){ |
|---|---|---|
| 5820 3000 | L | r2,=Q(var_x3)(,r3,0) |
| 4142 1000 | LA | r4,=Q(var_x3)(r2,r1,0) |
| 5800 4000 | L | r0,var_x3(,r4,0) |
| 5840 3004 | L | r4,=Q(var_x4)(,r3,4) |
| 4114 1000 | LA | r1,=Q(var_x4)(r4,r1,0) |
| 5810 1000 | L | r1,var_x4)(,r1,0) |
| 1E01 | ALR | r0,r1 |
| 1200 | LTR | r0,r0 |
| A774 00D3 | JNE | @2L2 |

In the above, the load and test instruction (LTR) results in a condition code being set in a condition code register. The following jump instruction (JNE) will execute based on that set condition code.

A data structure for representing function calling may be a graph, as function A can call a function B, which can call a function C, etc. This is sometimes referred to as a call graph. A graph reinforcement learning method can be leveraged to train a call graph. For instance, a graph neural network (graph reinforcement learning/graph convolutional network) may be suitable to train graph data. A set of n latest instructions provided based on manipulation of a stack, for instance, can be normalized or featured using any of various tools, such as TensorFlow or word2vec, as examples. Each n instructions can be treated as a n-dimensional vector. The pattern recognition system/machine can use a trained graph neural network (GNN) to determine patterns exhibited in these vector inputs. In this manner, inputs may be pushed through a GNN to result in predictions/node labels. Inputs to the GNN may include a latest n instructions in addition to the current instruction (say a function call or a branch causing stack manipulation), which is known. A graph reinforcement (as in this example) or other learning method can identify what kind of pattern corresponds to a function call and which corresponds to a branch, such as a conditional branch. The AI can look at various inputs (for instance from binary code of a target program) and identify whether an input group of instructions is associated with a particular function call or a particular conditional branch.

Accordingly, in some embodiments, the pattern recognition component includes an artificial intelligence model trained based on featurizing sets of instructions, and that is configured to accept as input an n-dimensional input vector of instructions (and optionally condition code(s)) of binary code of a target program and predict a function call or branch based on the input n-dimensional input vector.

Examples of pattern recognition are now provided with reference to specific code portions. The following presents example binary and assembly code for function calling of FUNCTION4:

```
*              rc = FUNCTION4(one, two, three, four);
5850 D0B4   L     r5,one(,r13,180)
5840 D0B8   L     r4,two(,r13,184)
4820 D0BC   LH    r2,three(,r13,188)
5800 D0C0   L     r0,four(,r13,192)
58F0 3028   L     r15,=V(FUNCTION4)(,r3,40)
4110 D098   LA    r1,#MX_TEMP2(,r13,152)
5050 D098   ST    r5,#MX_TEMP2(,r13,152)
5040 D09C   ST    r4,#MX_TEMP2(,r13,156)
5020 D0A0   ST    r2,#MX_TEMP2(,r13,160)
5000 D0A4   ST    r0,#MX_TEMP2(,r13,164)
0DEF        BASR  r14,r15
```

In the above, there is a load (LA) followed by a branch (BASR), with intervening instructions between these two instructions.

Similarly, the following presents example binary and assembly code for function calling of FUNCTION3, in which there is a load (LA) followed by a branch (BASR), with intervening instructions between these two instructions:

```
*              rc = FUNCTION3(one, two, three);
5840 D0B4   L r4,one(,r13,180)
5820 D0B8   L r2,two(,r13,184)
4800 D0BC   LH r0,three(,r13,188)
58F0 3024   L r15,=V(FUNCTION3)(,r3,36)
4110 D098   LA r1,#MX TEMP2(,r13,152)
5040 D098   ST r4,#MX_TEMP2(,r13,152)
5020 D09C   ST r2,#MX TEMP2(,r13,156)
5000 D0A0   ST r0,#MX TEMP2(,r13,160)
0DEF        BASR r14,r15
```

As yet another example of a load followed by a branch BASR, the following presents example binary and assembly code for function calling FUNCTION2:

```
*              var_z = FUNCTION2( );
58F0 301C   L     r15,=V(FUNCTION2)(,r3,28)
0DEF        BASR  r14,r15
```

The above example three sets of binary code exhibit a pattern. Specifically a first element of the pattern is 58F0 corresponding to the load for the target function followed by an address of the function or a calculated address according to the register—3028 for FUNCTION4, 3024 for FUNCTION3, and 301C for FUNCTION2. Another element of the pattern is 0DEF corresponding to the branch BASR instruction. There may be varying numbers of intervening instruction(s) between the two elements in these pattern instances. The intervening instructions could set parameters for the function call, for instance.

The function call pattern exhibited in the three examples above may be determined and represented as:

58F0 9999

[

41**

50**

]

0DEF

The 9999 indicates an arbitrary address, asterisks (*) represent wildcard characters, and the brackets enclose content that may or may not be present between the two instructions 58F0 and 0DEF. The pattern may be used in finding this type of function calling for various functions where it occurs throughout binary code of target program(s), and thereby identify such function calling in the target program(s) for use in producing an improved call graph.

The binder API discussed above may be used to map function addresses (3028, 3024, and 301C) to the function names themselves, i.e. FUNCTION4, FUNCTION3, and FUNCTION2, respectively, in a given set of binary code for a target program. These names, as opposed to the function addresses, can be used in a call graph to greatly improve comprehension of program flow control of the target program.

As another example, the following presents example binary and assembly code for branching to FUNCTION1:

```
*              rc = FUNCTION1(one, two, three);
5810 4864   L     r1,one(,r4,2148)
5820 4868   L     r2,two(,r4,2152)
4830 486C   LH    r3,three(,r4,2156)
5850 4804   L     r5,#Save_ADA Ptr_2(,r4,2052)
A775 FF1D   BRAS  r7,FUNCTION1
4701 0010   NOP   16(r1,)
```

From this, a pattern can be derived as follows:

[

48 48

58 48

]

A775 9999

The above presents an example branch pattern.

As another example of branch patterning, the following is a first example binary and assembly code:

| * |     | if( var_x3>90 var_x4< 60 ){ |
|---|-----|-----|
| 5810 D0C8 | L | r1,#CEECAACRENT |
| 4112 1000 | LA | r1,=Q(var_x3)(r2,r1,0) |
| 5800 1000 | L | r0,var_x3(,r1,0) |
| A70E 005A | CHI | r0,H'90' |
| A7D4 0004 | JNH | @2L4 |
|  | @2L3 | DS 0H |
| A7F4 000E | J | @2L5 |
|  | @2L4 | DS 0H |
| 5810 D0C8 | L | r1,#CEECAACRENT_2(,r13,200) |
| 5820 3004 | L | r2,=Q(var_x4)(,r3,4) |
| 4112 1000 | LA | r1,=Q(var_x4)(r2,r1,0) |
| 5800 1000 | L | r0,var_x4(,r1,0) |
| A70E 003C | CHI | r0,H'60' |
| A7B4 0010 | JNL | @2L6 |
|  | @2L5 | DS 0H |

The following is a second example binary and assembly code:

| * |     | if (var_z < 10) { |
|---|-----|-----|
| 5840 3010 | L | r4,=Q(var_z)(,r3,16) |
| 4114 1000 | LA | r1,=Q(var_z)(r4,r1,0) |
| 5800 1000 | L | r0,var_z(,r1,0) |
| A70E 000A | CHI | r0,H'10' |
| A7B4 0066 | JNL | @2L9 |

From the two examples immediately above, the following branch pattern can be derived:
58*0 AAAA
[58** Address1]
P202201840US01
[58** Address2]
[1E**]/*Arith Add*/A70E
BBBB
A7*4 9999

In the above pattern, asterisks again mean any of varying possible characters. The A7*4 corresponds to a jump. Different characters between the 'A7' and '4' digits have different meanings, for instance indicating a particular operator such as =, !=, <, < or =, >, > or =, and so on. AAAA and BBBB represent variables checked as part of the pattern.

As yet another example of branch patterning, the following is a first example binary and assembly code:

| * |     | if(var_x3 + var_x4 == 0){ |
|---|-----|-----|
| 5860 4804 | L | r6,#Save_ADA_Ptr_2(,r4,2052) |
| 5870 6000 | L | r7,=A(var_x3)(,r6,0) |
| 5800 7000 | L | r0,var_x3(,r7,0) |
| 5860 6004 | L | r6,=A(var_x4)(,r6,4) |
| 5860 6000 | L | r6,var_x4(,r6,0) |
| 1E06 | ALR | r0,r6 |
| 1200 | LTR | r0,r0 |
| A774 00B9 | JNE | @2L2 | and the following is a second example binary and assembly code:

|  |     | if(var_x3 + var_x4 == 0){ |
|---|-----|-----|
| 5820 3000 | L | r2,=Q(var_x3)(,r3,0) |
| 4142 1000 | LA | r4,=Q(var_x3)(r2,r1,0) |
| 5800 4000 | L | r0,var_x3(,r4,0) |
| 5840 3004 | L | r4,=Q(var_x4)(,r3,4) |
| 4114 1000 | LA | r1,=Q(var_x4)(r4,r1,0) |
| 5810 1000 | L | r1,var_x4(,r1,0) |

-continued

| 1E01 | ALR | r0,r1 |
|---|-----|-----|
| 1200 | LTR | r0,r0 |
| A774 00D3 | JNE | @2L2 |

From the immediately preceding first and second examples, the following pattern may be determined:
58*0 AAAA
[58** Address1]
[58** Address2]
[1E**]/*Arith Add*/12**
A7*4 9999
where, as above, asterisks mean any of varying possible characters, the A7*4 corresponds to a jump, different characters between A7 and 4 have different meanings, and AAAA represents a variable.

With the patterns determined, target binary code (binary code of target program(s), which could be entirely different program(s) than those serving as the basis for pattern learning) can be mined to identify function calls, branches, relations therebetween, and variable and function names, as examples. This can entail, for instance, looking into the target binary code and identifying the function calls, the branches including conditions to those branches, relations, such as under what conditions certain branches are taken to certain functions. Additionally, function and variable names can be identified, via an application programming interface for instance, using a symbol table of the binary code that maps function and variable names to memory addresses identified in the binary code.

Figure 7:
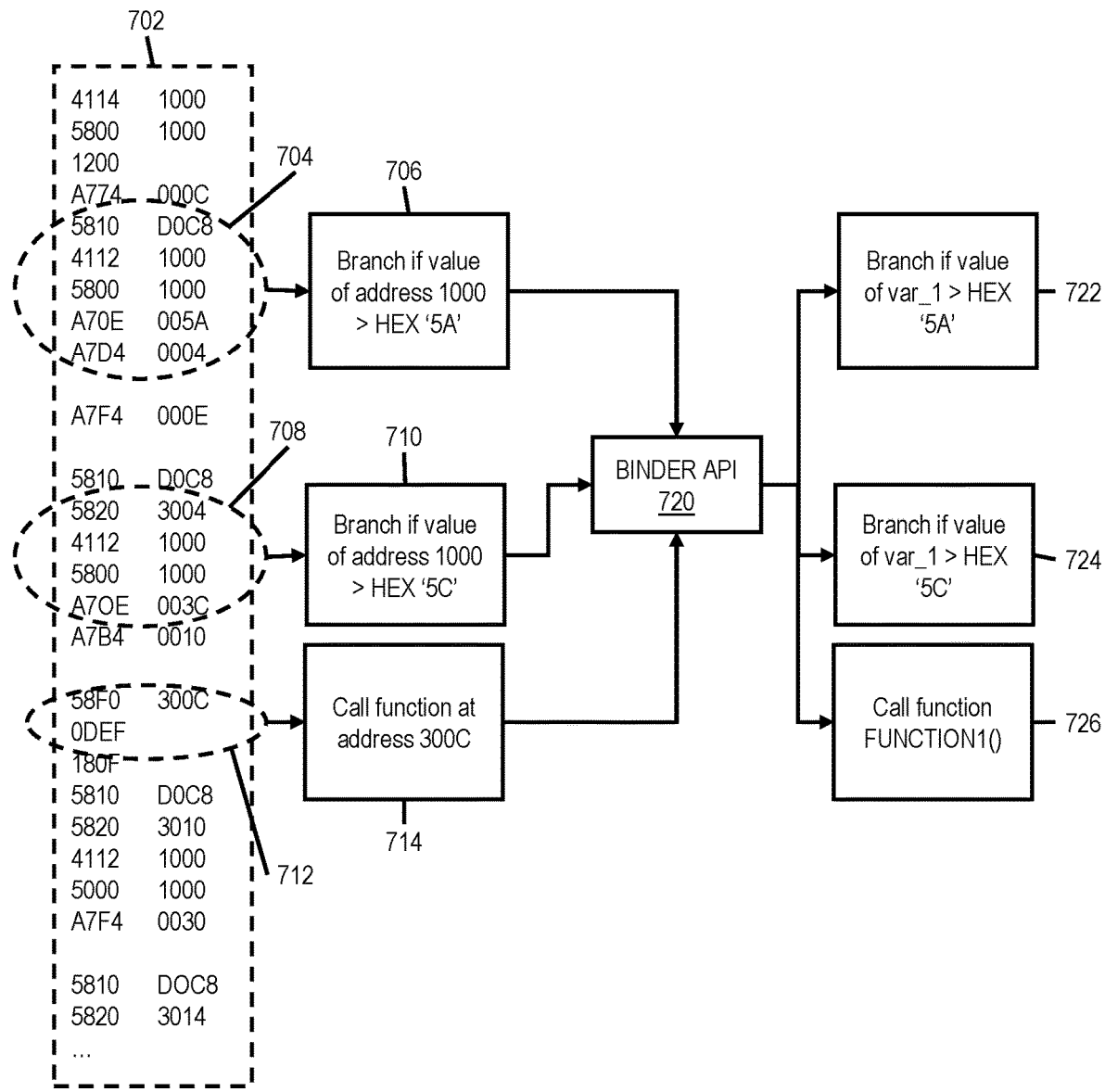
FIG. 7 depicts an example of identifying function calls and branches, relations therebetween, and function and variable names from binary code, in accordance with aspects described herein.

FIG. 7 depicts an example of identifying function calls and branches, relations therebetween, and function and variable names from target binary code, in accordance with aspects described herein. A portion 702 of target binary code is presented and shows a sequence of instructions. Within this overall sequence, determined patterns are used to find code sequences that match those patterns. For instance, sequence 704 is found to match to a pattern representing a flow control (as conditional branch 706) to branch if the value at address 1000 is greater than HEX '5A', sequence 708 is found to match to a pattern representing conditional branch 710 to branch if the value at address 1000 is greater than HEX '3C', and sequence 712 is found to match to a pattern representing a function call 714 to the function at address 300C. Via the binder API 720, each of 706, 710 and 714 can be re-represented as 722, 724, and 726 respectively. Specifically, the address 1000 is identified as var 1, and the function at address 300C is identified as FUNCTION10.

To illustrate aspects of provision of improved representations of program flow control, initially an example source code portion of a target is provided as follows:

```
int myfunction( ) {
    int rc;
    int one = 333;
    long two = 333;
    short three = 333;
    int four = 333;
    int five = 333;
    if(var_x3 + var_x4 == 0){
        if(var_y1 || var_x3 > 90 || var_x4 < 60) {
            var_z = FUNCTION1( );
        } else if(var_x1 + var_z > 200 && var_x2-var_z < 5) {
            var_z = FUNCTION2( );
        }
        if (var_z < 10) {
            var_x1 = var_x1 + 100;
```

-continued

```
        var_z = var_z + 1;
        if (var_x1 + var_y1 > 0 && var_x2 + var_y2 > 0) {
            rc = FUNCTION3(one, two, three);
        } else {
            rc = FUNCTION4(one, two, three, four);
        }
      }
    } else {
      rc = rc + FUNCTION5(one, two, three, four, five);
    }
    return rc;
}
```

Figure 8:
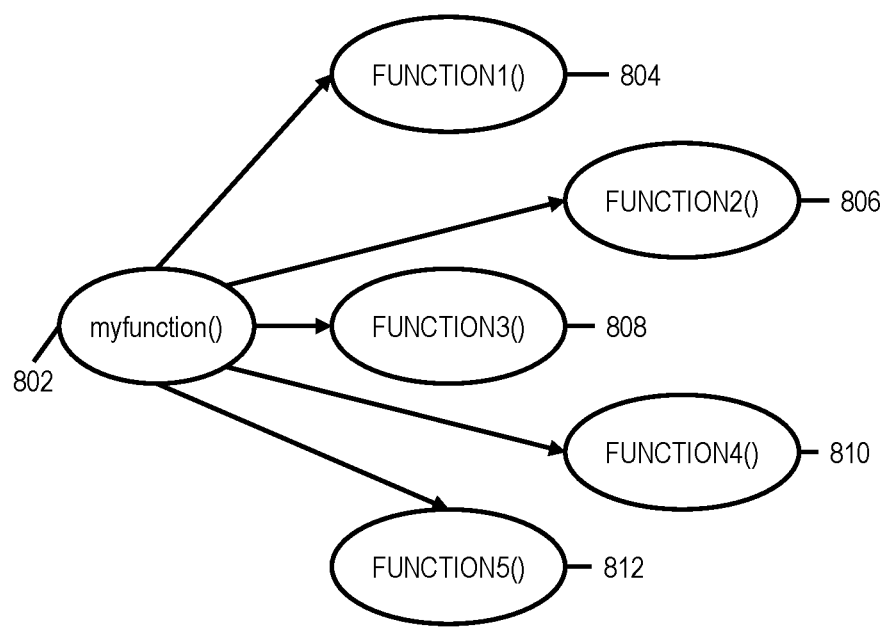
FIG. 8 depict an example conventional call graph.

FIG. 8 depicts an example call graph that might be conventionally generated by static source code analysis, and shows that myfunction( ) calls FUNCTION1( )804, FUNCTION2( )806, FUNCTION3( )808, FUNCTION4( )810, and FUNCTION5( )812. Lacking is any information relative to, for example, conditions under which various functions are called.

Figure 9:
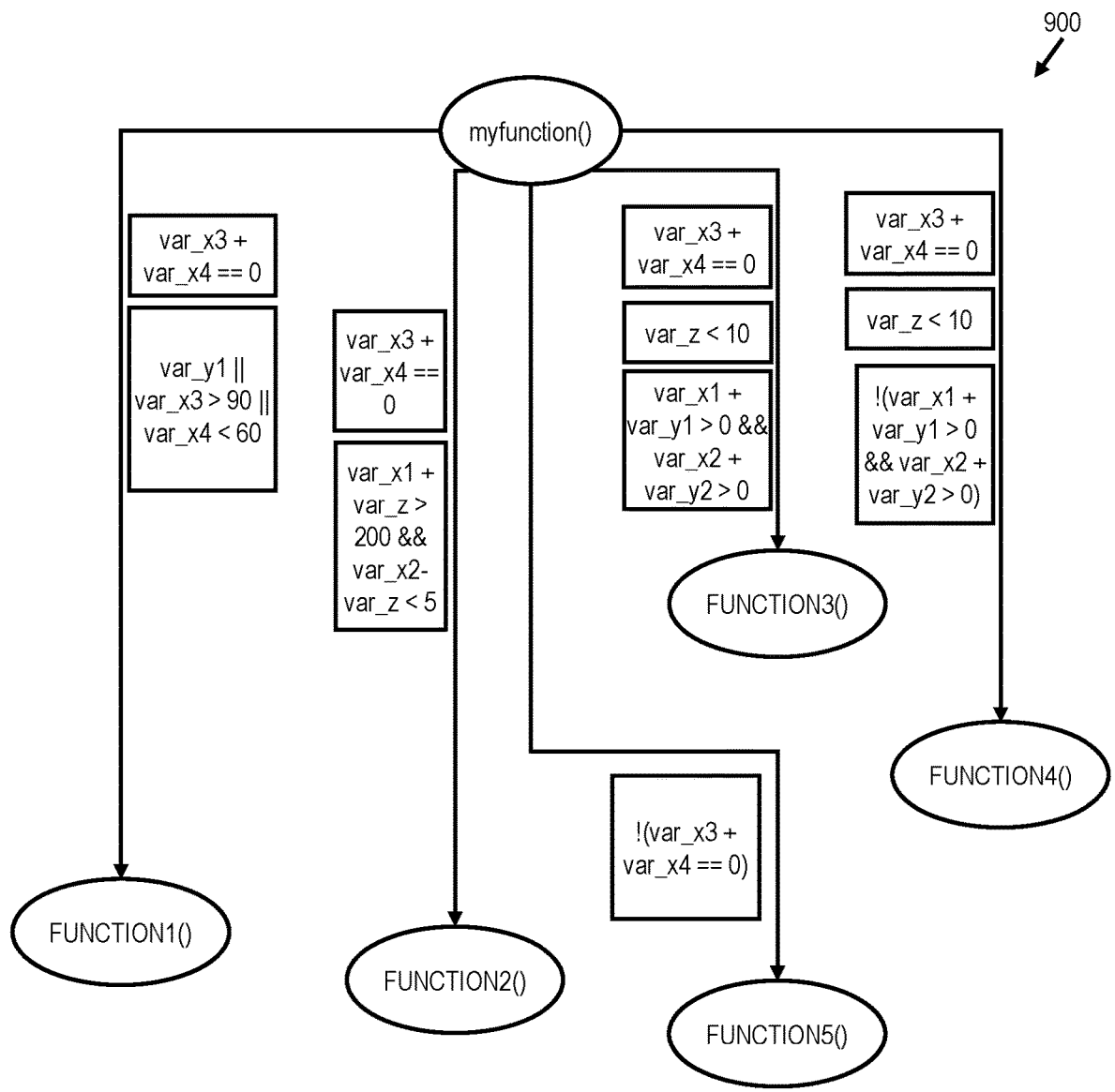
FIG. 9 depicts an improved call graph that may be generated in accordance with aspects described herein.

FIG. 9 depicts an improved call graph 900 that may be generated in accordance with aspects described herein using only the corresponding binary code of the target program of FIG. 8. Shown in the call graph 900, in addition to function calls, branches, and functions and variable names, is conditions along branch lines for branching from myfunction( ) to the various functions FUNCTION1( ) FUNCTION2( ) FUNCTION3( ) FUNCTION4( ) and FUNCTION5( )

Aspects can automatically generate and provide such a representation of program flow control of the target program using the identified function calls and branches, relations, and function and variable names. For instance, provision of the representation of program flow control can include building and presenting in a graphical interface a call graph identifying functions of the binary code, calls as between the functions to indicate program flow, and conditions for branching from one function to another function of the binary code. In examples where an initial call graph (such as that depicted in FIG. 8) is available and indicates the functions of the binary code, a process can augment this initial call graph to graphically convey the calls as between the functions and the conditions for branching, which augmenting produces an augmented call graph that is presented/provided.

For the known function calls and conditional branches, any of various graph algorithms can be used to format the graph (representation of program flow control, e.g. a call graph). Example such algorithms include but are not limited to: Dijkstra's algorithm, Bellman Ford algorithm, k shortest path routing, and/or backtracking/backjumping (a general algorithm for finding all (or some) solutions to constraint satisfaction problems).

Figure 10:
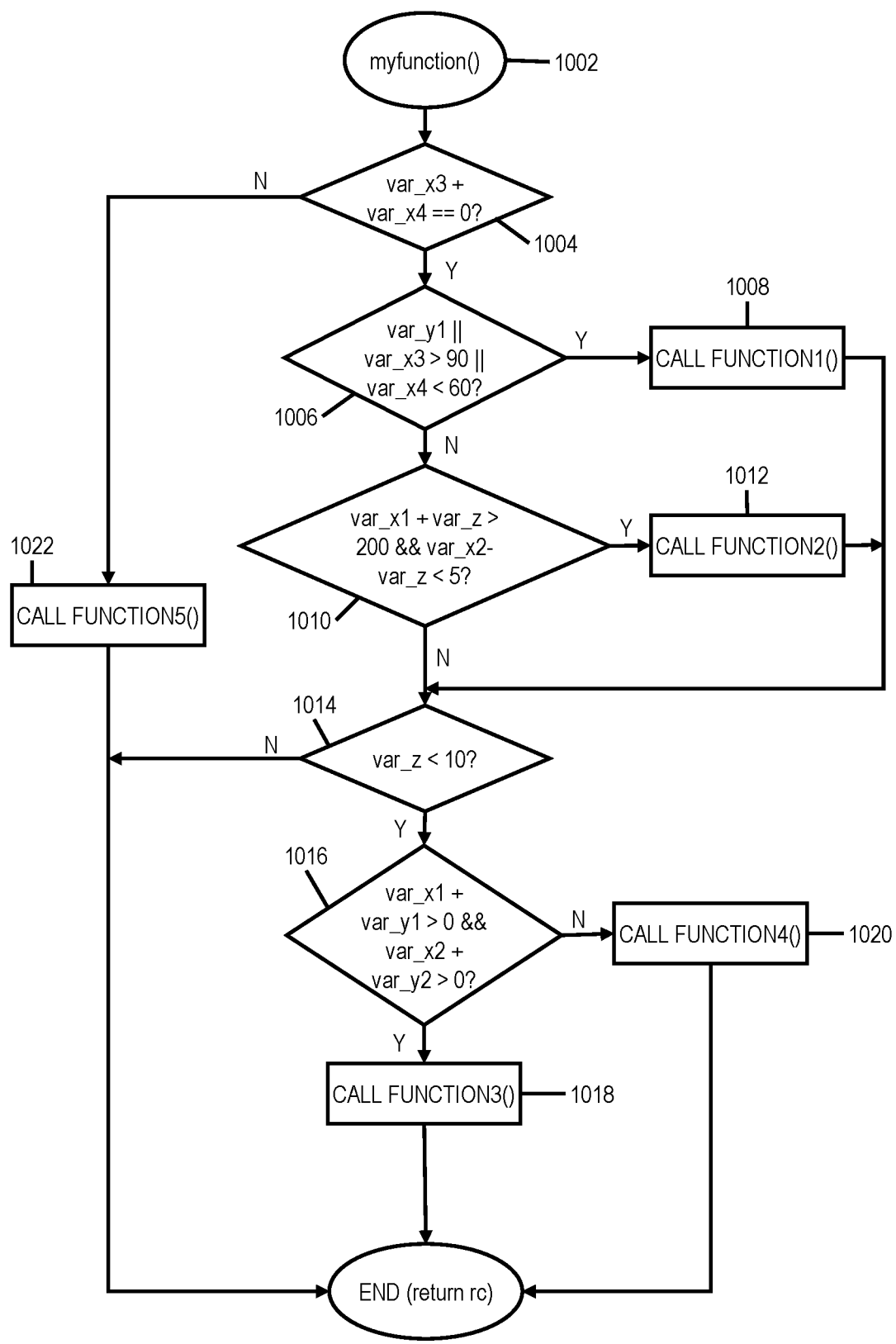
FIG. 10 presents an example representation of program flow control generated in accordance with aspects described herein.

FIG. 10 presents another example representation of program flow control. In examples, this may be built automatically based on a call graph, though a call graph is not a necessary starting point to build such a representation as shown in FIG. 10. The representation if that of a process flow beginning with myfunction( )1002. The process follows the flow of the source code laid out above. For instance, the process, in performing myfunction( ) determines (1004) whether var_x3+var_x4==0. If so (1004, Y), the process proceeds by determining (1006) whether var_y1||var_x3>90||var_x4<60. If so (1006, Y), the process calls (1008) FUNCTION1( ) Otherwise (1006, N), the process proceeds by determining (1010) whether var_x1+var_z>200 && var_x2-var_z<5. If so (1010, Y), the process calls (1012) FUNCTION2( ) After calling FUNCTION1( ) at 1008 or FUNCTION2( ) at 1012, or if it was determined both at 1006 not to call FUNCTION1( ) and at 1010 not to call FUNCTION2( ) the process proceeds by determining at 1014 whether var_z<10. If so (1014, Y), the process determines (1016) whether var_x1+var_y1>0 && var_x2+var_y2>0, and if so calls (1018) FUNCTION3( ) otherwise calls (1020) FUNCTION4( ). After such call of FUNCTION3( ) or FUNCTION4( ), the process returns rc and ends. If it was instead determined at 1014 that var_z is not less than 10 (1014, N), the process returns rc and ends. If it was determined at 1004 that var_x3+var_x4 is not equal to 0 (1004, N), then the process calls (1020) FUNCTION5( ) and returns rc and ends.

Accordingly, aspects described herein advantageously facilitate diagnosis and/or analysis of programs via a call graph that may be generated from binary code of a program, without the need for the corresponding source code of that program and regardless whether the program source code is available/accessible. This can be especially useful for software projects that are being developed based on old projects in which only binary code is accessible. Aspects enable error diagnostics, including, for instance unreproducible errors, of programs with significant histories. Aspect may be performed automatically by computer system(s), and users need not know logic of the program in advance or have source code of the program.

Figure 11:
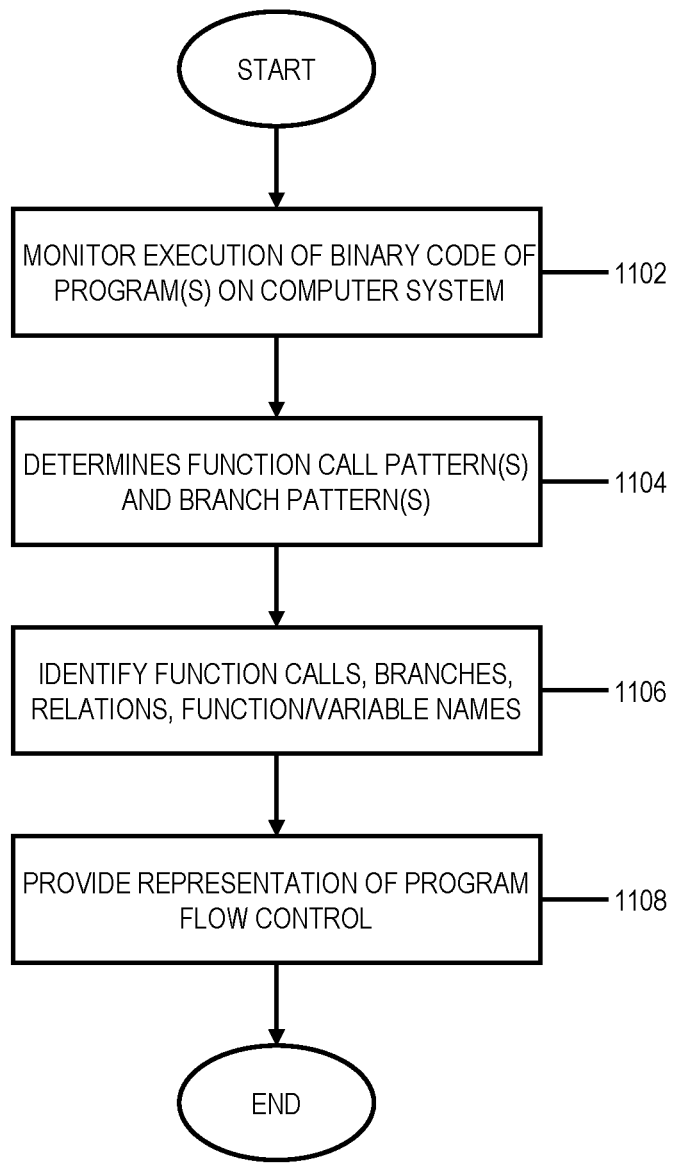
FIG. 11 depicts an example process for determining and providing improved representations of program flow control, in accordance with aspects described herein.
Figure 12:
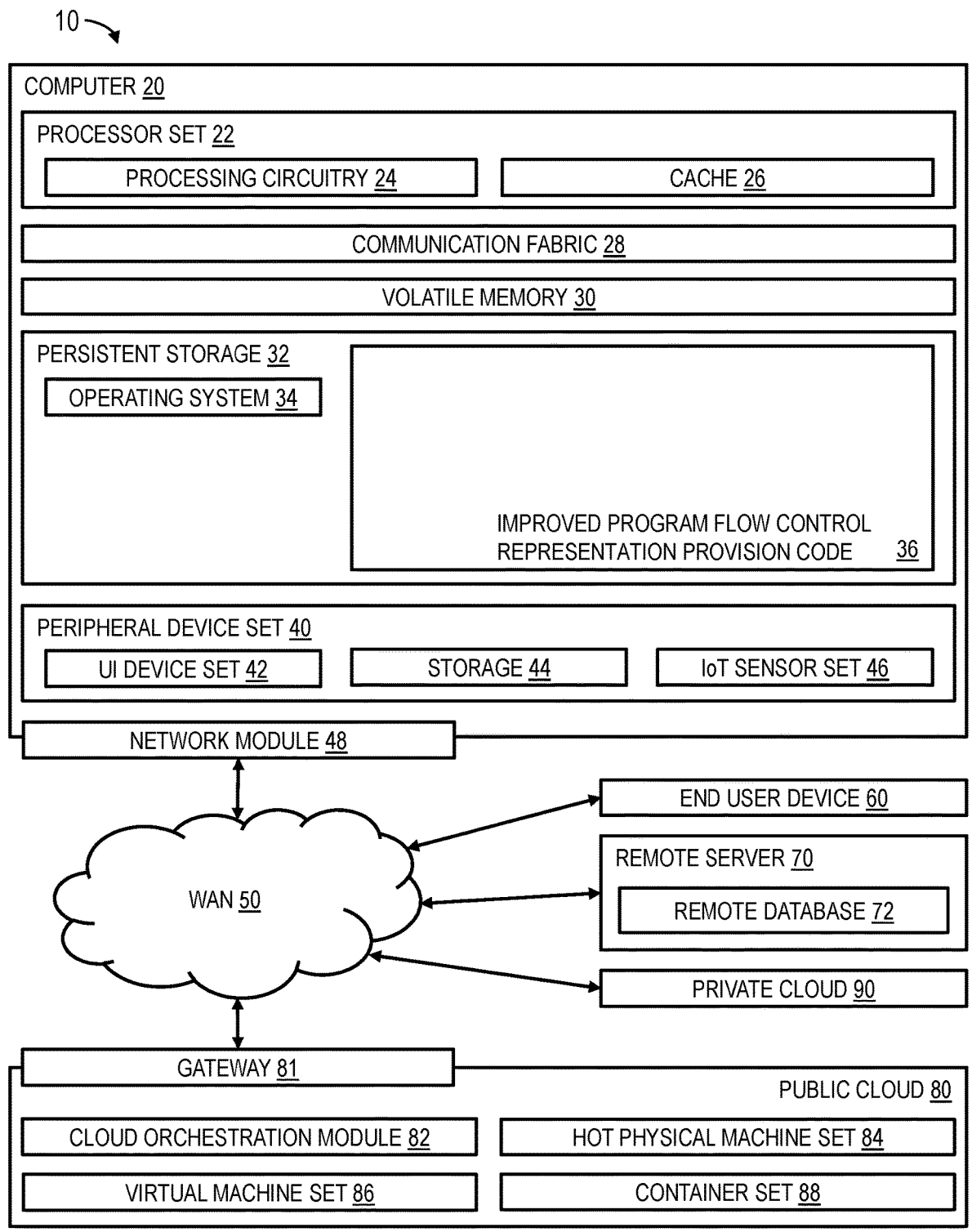
FIG. 12 depicts an example environment to incorporate and use aspects described herein.

FIG. 11 depicts an example process for determining and providing improved representations of program flow control, in accordance with aspects described herein. In some examples, the process is performed by one or more computer systems, such as those described herein. The process includes provision of a representation of program flow control, of a target program, that uses identified function calls and branches, relations between the function calls and branches, and function and variable names. Advantages provided by the process include that they facilitate improved diagnosis, analysis, debugging and/or program comprehension via an improved and augmented representation of program flow control in comparison to conventional offerings. Additionally, this is provided from the binary code of the target program, e.g. without the need for access to program source code of the target program and even the source code of programs on which the pattern learning is based, and regardless whether the target program source code is available/accessible.

The process of FIG. 11 begins by monitoring (1102) execution of binary code of one or more programs on a computer system. The monitoring includes, for instance, monitoring manipulation of at least one call stack maintained by the computer system for the execution of the binary code of the one or more programs. In some embodiments, the monitoring execution of the binary code further includes monitoring processor condition codes indicating conditions under which conditional branches are taken in execution of the binary code of the one or more programs. Based on the monitoring, the process determines (1104) at least one function call pattern and at least one branch pattern exhibited by the execution of the binary code of the one or more programs.

In some embodiments, the monitoring further includes maintaining a buffer of most-recently executed instructions, and determining the at least one function call pattern and at least one branch pattern includes providing, to a pattern recognition component, contents of the buffer upon manipulation of the program stack, where the pattern recognition component determines the at least one function call pattern and at least one branch pattern by through pattern recognition based at least in part on the provided buffer contents. This has an advantage as the provided buffer content informs of a context in which a given function call or branch is performed, which is in turn useful for identifying other portions of other code having similar function call or branch behavior.

In examples, the pattern recognition component includes an artificial intelligence model trained based on featurizing sets of instructions, the artificial intelligence model configured to accept as input an n-dimensional input vector of instructions and predict a function call pattern or branch pattern based on the input n-dimensional input vector. Use of an artificial intelligence model in this manner has an advantage in that pattern determination can be taught and improved/refined automatically based on training in order to accurately classify program flow controls in target programs, including controls not explicitly previously observed and identified as such.

Optionally, in embodiments where monitoring execution of the binary code includes monitoring processor condition codes indicating conditions under which conditional branches are taken, the determination of the at least one function call pattern and at least one branch pattern can include providing the processor condition codes to the pattern recognition component, where the pattern recognition component determines the at least one function call pattern and at least one branch pattern by pattern recognition based at least in part on the provided processor condition codes. For instance, a conditional branch pattern reflecting a pattern under which a conditional branch is taken may be determined. Monitoring and providing condition codes in conjunction with stack manipulations indicating functions calls and branches has an advantage in that conditions for observed branches can be identified and attached to observed branches for provision in the representation of the program flow control, providing better understanding of program flow of target program(s).

Continuing with FIG. 11, the process obtains binary code of a target program and identifies (1106), from the binary code of the target program, and using the determined at least one function call pattern and at least one branch pattern, function calls and branches, relations between the function calls and branches, and function and variable names in the target binary code. The identification of the function and variable names can include identifying, via an application programming interface, a function or variable name using a symbol table of the binary code, of the target application, that maps function and variable names to memory addresses, which has an advantage of identifying variables and functions, in a representation of program flow control, in a user-readable and useable manner, rather than as an address.

Additionally, the method provides (1108) a representation of program flow control of the target program using the identified function calls and branches, relations, and function and variable names. In embodiments, the providing the representation of program flow control includes building and presenting in a graphical interface a call graph identifying functions of the binary code of the target program, calls as between the functions to indicate program flow, and conditions for branching from one function to another function of the binary code of the target program. Such presentation has an advantage in that it enables a user to readily identify via graphical depiction program flow control elements beyond mere function names and indications of which functions call each other, which has advantages of utility and program comprehension.

In some examples, providing the representation of program flow control includes obtaining an initial call graph indicating the functions of the binary code of the target program, and augmenting the initial call graph to graphically convey the calls as between the functions and the conditions for branching, where the augmenting produces an augmented call graph, and the presenting presents the augmented call graph. Augmenting an initial call graph has an advantage in that a new call graph need not be generated from scratch, as instead a conventional call graph can be augmented with additional information as obtained by way of aspects described herein, which provides speed and efficiency by avoiding extraneous work.

In some examples, the target program is a program of the one or more programs for which execution was monitored to determine the function call and branch patterns. In other examples, the target program is a different program than each of the one or more programs, i.e. is not one of the one or more programs.

Although various examples are provided, variations are possible without departing from a spirit of the claimed aspects.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 10 contains an example of an environment for the execution of at least some of the computer code involved in performing the inventive methods, such as improved program flow control representation provision code 36. In addition to block 36, computing environment 10 includes, for example, computer 20, wide area network (WAN) 50, end user device (EUD) 60, remote server 70, public cloud 80, and private cloud 90. In this embodiment, computer 20 includes processor set 22 (including processing circuitry 24 and cache 26), communication fabric 28, volatile memory 30, persistent storage 32 (including operating system 34 and block 36, as identified above), peripheral device set 40 (including user interface (UI) device set 42, storage 44, and Internet of Things (IoT) sensor set 46), and network module 48. Remote server 70 includes remote database 72. Public cloud 80 includes gateway 81, cloud orchestration module 82, host physical machine set 84, virtual machine set 86, and container set 88.

COMPUTER 20 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 72. As is well understood in the art of computer technology, and depending upon the technology, performance of a computer-implemented method may be distributed among multiple computers and/or between multiple locations. On the other hand, in this presentation of computing environment 10, detailed discussion is focused on a single computer, specifically computer 20, to keep the presentation as simple as possible. Computer 20 may be located in a cloud, even though it is not shown in a cloud in FIG. 1. On the other hand, computer 20 is not required to be in a cloud except to any extent as may be affirmatively indicated.

PROCESSOR SET 22 includes one, or more, computer processors of any type now known or to be developed in the future. Processing circuitry 24 may be distributed over multiple packages, for example, multiple, coordinated integrated circuit chips. Processing circuitry 24 may implement multiple processor threads and/or multiple processor cores. Cache 26 is memory that is located in the processor chip package(s) and is typically used for data or code that should be available for rapid access by the threads or cores running on processor set 22. Cache memories are typically organized into multiple levels depending upon relative proximity to the processing circuitry. Alternatively, some, or all, of the cache for the processor set may be located "off chip." In some computing environments, processor set 22 may be designed for working with qubits and performing quantum computing.

Computer readable program instructions are typically loaded onto computer 20 to cause a series of operational steps to be performed by processor set 22 of computer 20 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 26 and the other storage media discussed below. The program instructions, and associated data, are accessed by processor set 22 to control and direct performance of the inventive methods. In computing environment 10, at least some of the instructions for performing the inventive methods may be stored in block 36 in persistent storage 32.

COMMUNICATION FABRIC 28 is the signal conduction paths that allow the various components of computer 20 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 30 is any type of volatile memory now known or to be developed in the future. Examples include dynamic type random access memory (RAM) or static type RAM. Typically, the volatile memory is characterized by random access, but this is not required unless affirmatively indicated. In computer 20, the volatile memory 30 is located in a single package and is internal to computer 20, but, alternatively or additionally, the volatile memory may be distributed over multiple packages and/or located externally with respect to computer 20.

PERSISTENT STORAGE 32 is any form of non-volatile storage for computers that is now known or to be developed in the future. The non-volatility of this storage means that the stored data is maintained regardless of whether power is being supplied to computer 20 and/or directly to persistent storage 32. Persistent storage 32 may be a read only memory (ROM), but typically at least a portion of the persistent storage allows writing of data, deletion of data and re-writing of data. Some familiar forms of persistent storage include magnetic disks and solid state storage devices. Operating system 34 may take several forms, such as various known proprietary operating systems or open source Portable Operating System Interface type operating systems that employ a kernel. The code included in block 36 typically includes at least some of the computer code involved in performing the inventive methods.

PERIPHERAL DEVICE SET 40 includes the set of peripheral devices of computer 20. Data communication connections between the peripheral devices and the other components of computer 20 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 42 may include components such as a display screen, speaker, microphone, wearable devices (such as goggles and smart watches), keyboard, mouse, printer, touchpad, game controllers, and haptic devices. Storage 44 is external storage, such as an external hard drive, or insertable storage, such as an SD card. Storage 44 may be persistent and/or volatile. In some embodiments, storage 44 may take the form of a quantum computing storage device for storing data in the form of qubits. In embodiments where computer 20 is required to have a large amount of storage (for example, where computer 20 locally stores and manages a large database) then this storage may be provided by peripheral storage devices designed for storing very large amounts of data, such as a storage area network (SAN) that is shared by multiple, geographically distributed computers. IoT sensor set 46 is made up of sensors that can be used in Internet of Things applications. For example, one sensor may be a thermometer and another sensor may be a motion detector.

NETWORK MODULE 48 is the collection of computer software, hardware, and firmware that allows computer 20 to communicate with other computers through WAN 50. Network module 48 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 48 are performed on the same physical hardware device. In other embodiments (for example, embodiments that utilize software-defined networking (SDN)), the control functions and the forwarding functions of network module 48 are performed on physically separate devices, such that the control functions manage several different network hardware devices. Computer readable program instructions for performing the inventive methods can typically be downloaded to computer 20 from an external computer or external storage device through a network adapter card or network interface included in network module 48.

WAN 50 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 60 is any computer system that is used and controlled by an end user (for example, a customer of an enterprise that operates computer 20), and may take any of the forms discussed above in connection with computer 20. EUD 60 typically receives helpful and useful data from the operations of computer 20. For example, in a hypothetical case where computer 20 is designed to provide a recommendation to an end user, this recommendation would typically be communicated from network module 48 of computer 20 through WAN 50 to EUD 60. In this way, EUD 60 can display, or otherwise present, the recommendation to an end user. In some embodiments, EUD 60 may be a client device, such as thin client, heavy client, mainframe computer, desktop computer and so on.

REMOTE SERVER 70 is any computer system that serves at least some data and/or functionality to computer 20. Remote server 70 may be controlled and used by the same entity that operates computer 20. Remote server 70 represents the machine(s) that collect and store helpful and useful data for use by other computers, such as computer 20. For example, in a hypothetical case where computer 20 is designed and programmed to provide a recommendation based on historical data, then this historical data may be provided to computer 20 from remote database 72 of remote server 70.

PUBLIC CLOUD 80 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 80 is performed by the computer hardware and/or software of cloud orchestration module 82. The computing resources provided by public cloud 80 are typically implemented by virtual computing environments that run on various computers making up the computers of host physical machine set 84, which is the universe of physical computers in and/or available to public cloud 80. The virtual computing environments (VCEs) typically take the form of virtual machines from virtual machine set 86 and/or containers from container set 88. It is understood that these VCEs may be stored as images and may be transferred among and between the various physical machine hosts, either as images or after instantiation of the VCE. Cloud orchestration module 82 manages the transfer and storage of images, deploys new instantiations of VCEs and manages active instantiations of VCE deployments. Gateway 81 is the collection of computer software, hardware, and firmware that allows public cloud 80 to communicate through WAN 50.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 90 is similar to public cloud 80, except that the computing resources are only available for use by a single enterprise. While private cloud 90 is depicted as being in communication with WAN 50, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 80 and private cloud 90 are both part of a larger hybrid cloud.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    monitoring execution of binary code of one or more programs on a computer system, the monitoring comprising monitoring manipulation of at least one call stack maintained by the computer system for the execution of the binary code;
    based on the monitoring, determining at least one function call pattern and at least one branch pattern exhibited by the execution of the binary code;
    obtaining binary code of a target program and identifying, from the binary code of the target program, and using the determined at least one function call pattern and at least one branch pattern, function calls and branches, relations between the function calls and branches, and function and variable names; and
    providing a representation of program flow control of the target program using the identified function calls and branches, relations, and function and variable names.

2. The method of claim 1, wherein the monitoring further comprises maintaining a buffer of most-recently executed instructions, and wherein the determining the at least one function call pattern and at least one branch pattern comprises providing, to a pattern recognition component, contents of the buffer upon manipulation of the program stack, wherein the pattern recognition component determines the at least one function call pattern and at least one branch pattern by through pattern recognition based at least in part on the provided buffer contents.

3. The method of claim 2, wherein the pattern recognition component comprises an artificial intelligence model trained based on featurizing sets of instructions, the artificial intelligence model configured to accept as input an n-dimensional input vector of instructions and predict a function call pattern or branch pattern based on the input n-dimensional input vector.

4. The method of claim 2, wherein the monitoring the execution of the binary code further comprises monitoring processor condition codes indicating conditions under which conditional branches are taken, wherein the at least one branch pattern comprises at least one conditional branch pattern reflecting a pattern under which a conditional branch is taken.

5. The method of claim 4, wherein the identifying identifies a relation between a function call and a conditional branch in the binary code of the target program, the relation indicating one or more conditions under which the function call is made.

6. The method of claim 4, wherein the determining the at least one function call pattern and at least one branch pattern comprises providing the processor condition codes to the pattern recognition component, wherein the pattern recognition component determines the at least one function call pattern and at least one branch pattern by pattern recognition based at least in part on the provided processor condition codes.

7. The method of claim 1, wherein the identifying the function and variable names comprises identifying, via an application programming interface, a function or variable name using a symbol table of the binary code, of the target program, that maps function and variable names to memory addresses.

8. The method of claim 1, wherein the providing the representation of program flow control comprises building and presenting in a graphical interface a call graph identifying functions of the binary code of the target program, calls as between the functions to indicate program flow, and conditions for branching from one function to another function of the binary code of the target program.

9. The method of claim 8, wherein the providing comprises obtaining an initial call graph indicating the functions of the binary code of the target program, and augmenting the initial call graph to graphically convey the calls as between the functions and the conditions for branching, the augmenting producing an augmented call graph, wherein the presenting presents the augmented call graph.

10. The method of claim 1, wherein the target program is one selected from the group consisting of (i) a program of the one or more programs, and (ii) a different program than each of the one or more programs.

11. A computer system comprising:
    a memory; and
    a processor in communication with the memory, wherein the computer system is configured to perform a method comprising:
        monitoring execution of binary code of one or more programs on a computer system, the monitoring comprising monitoring manipulation of at least one call stack maintained by the computer system for the execution of the binary code;
        based on the monitoring, determining at least one function call pattern and at least one branch pattern exhibited by the execution of the binary code;
        obtaining binary code of a target program and identifying, from the binary code of the target program, and using the determined at least one function call pattern and at least one branch pattern, function calls and branches, relations between the function calls and branches, and function and variable names; and
        providing a representation of program flow control of the target program using the identified function calls and branches, relations, and function and variable names.

12. The computer system of claim 11, wherein the monitoring further comprises maintaining a buffer of most-recently executed instructions, and wherein the determining the at least one function call pattern and at least one branch pattern comprises providing, to a pattern recognition component, contents of the buffer upon manipulation of the program stack, wherein the pattern recognition component determines the at least one function call pattern and at least one branch pattern by through pattern recognition based at least in part on the provided buffer contents.

13. The computer system of claim 12, wherein the pattern recognition component comprises an artificial intelligence model trained based on featurizing sets of instructions, the artificial intelligence model configured to accept as input an n-dimensional input vector of instructions and predict a function call pattern or branch pattern based on the input n-dimensional input vector.

14. The computer system of claim 12, wherein the monitoring the execution of the binary code further comprises monitoring processor condition codes indicating conditions under which conditional branches are taken, wherein the at least one branch pattern comprises at least one conditional branch pattern reflecting a pattern under which a conditional branch is taken, and wherein the identifying identifies a relation between a function call and a conditional branch in the binary code of the target program, the relation indicating one or more conditions under which the function call is made.

15. The computer system of claim 14, wherein the determining the at least one function call pattern and at least one branch pattern comprises providing the processor condition codes to the pattern recognition component, wherein the pattern recognition component determines the at least one function call pattern and at least one branch pattern by pattern recognition based at least in part on the provided processor condition codes.

16. The computer system of claim 11, wherein the providing the representation of program flow control comprises building and presenting in a graphical interface a call graph identifying functions of the binary code of the target program, calls as between the functions to indicate program flow, and conditions for branching from one function to another function of the binary code of the target program.

17. A computer program product comprising:
a computer readable storage medium readable by a processing circuit and storing instructions for execution by the processing circuit for performing a method comprising:
monitoring execution of binary code of one or more programs on a computer system, the monitoring comprising monitoring manipulation of at least one call stack maintained by the computer system for the execution of the binary code;
based on the monitoring, determining at least one function call pattern and at least one branch pattern exhibited by the execution of the binary code;
obtaining binary code of a target program and identifying, from the binary code of the target program, and using the determined at least one function call pattern and at least one branch pattern, function calls and branches, relations between the function calls and branches, and function and variable names; and
providing a representation of program flow control of the target program using the identified function calls and branches, relations, and function and variable names.

18. The computer program product of claim 17, wherein the monitoring further comprises maintaining a buffer of most-recently executed instructions, and wherein the determining the at least one function call pattern and at least one branch pattern comprises providing, to a pattern recognition component, contents of the buffer upon manipulation of the program stack, wherein the pattern recognition component determines the at least one function call pattern and at least one branch pattern by through pattern recognition based at least in part on the provided buffer contents.

19. The computer program product of claim 18, wherein the pattern recognition component comprises an artificial intelligence model trained based on featurizing sets of instructions, the artificial intelligence model configured to accept as input an n-dimensional input vector of instructions and predict a function call pattern or branch pattern based on the input n-dimensional input vector.

20. The computer program product of claim 18, wherein the monitoring the execution of the binary code further comprises monitoring processor condition codes indicating conditions under which conditional branches are taken, wherein the at least one branch pattern comprises at least one conditional branch pattern reflecting a pattern under which a conditional branch is taken, wherein the determining the at least one function call pattern and at least one branch pattern comprises providing the processor condition codes to the pattern recognition component, wherein the pattern recognition component determines the at least one function call pattern and at least one branch pattern by pattern recognition based at least in part on the provided processor condition codes, and wherein the identifying identifies a relation between a function call and a conditional branch in the binary code of the target program, the relation indicating one or more conditions under which the function call is made.

\* \* \* \* \*